US012632888B2

(12) United States Patent
Pham et al.

(10) Patent No.: US 12,632,888 B2
(45) Date of Patent: May 19, 2026

(54) RECIPE AND EVENT PLANNING AND DISTRIBUTION TO PROVIDE INTERACTIVE AND REUSABLE CONTENT, E-COMMERCE, AND SOCIAL ENGAGEMENT

(71) Applicant: Macro Hardworks LLC, Cincinna, OH (US)

(72) Inventors: Quang Son Pham, Oxford, OH (US); Kyle Bavis, Cincinna, OH (US)

( * ) Notice: Subject to any disclaimer, the term of this patent is extended or adjusted under 35 U.S.C. 154(b) by 60 days.

(21) Appl. No.: 18/639,008

(22) Filed: Apr. 18, 2024

(65) Prior Publication Data

US 2025/0328940 A1 Oct. 23, 2025

(51) Int. Cl.
*G06Q 30/00* (2023.01)
*G06Q 10/0875* (2023.01)
*G06Q 30/0601* (2023.01)

(52) U.S. Cl.
CPC ..... *G06Q 30/0621* (2013.01); *G06Q 10/0875* (2013.01); *G06Q 30/0631* (2013.01); *G06Q 30/0643* (2013.01)

(58) Field of Classification Search
CPC ........... G06Q 30/0621; G06Q 10/0875; G06Q 30/0631; G06Q 30/0643
See application file for complete search history.

(56) References Cited

U.S. PATENT DOCUMENTS

2024/0029131 A1* 1/2024 Chan ...................... G06Q 30/06

OTHER PUBLICATIONS

S. Kaswan, Amita, P. Kumar and L. Yugal, "Implementation of a Personalized and Healthy Meal Recommendation System using Website in aid to Achieve User Dietary Preferences," 2024 International Conference on Trends in Quantum Computing and Emerging Business Technologies, Pune, India, 2024, pp. 1-4. (Year: 2024).*

* cited by examiner

*Primary Examiner* — Anand Loharikar
(74) *Attorney, Agent, or Firm* — The Rapacke Law Group, LLC

(57) ABSTRACT

Systems, methods, and other embodiments associated with an interactive customizable meal and event planning and management system for facilitating personal organization and planning, e-commerce, social engagement and collaboration, are described. In one embodiment, a method includes generating a customizable plan module of a multi-process meal plan including creating one or more recipe cards, each recipe card includes ingredient, dietary, allergen, or nutritional information, and configuring the at least one recipe card to define a meal component of a plurality of meal components of the multi-process plan, where each defined meal component includes at least one recipe card. The example method may also include displaying partitions for each customizable plan module, each partition corresponding to one meal component, and each partition receiving at least one recipe card for defining a corresponding meal component and retrieving a nutritional information for each recipe card based on the contents of the recipe card.

19 Claims, 6 Drawing Sheets

100

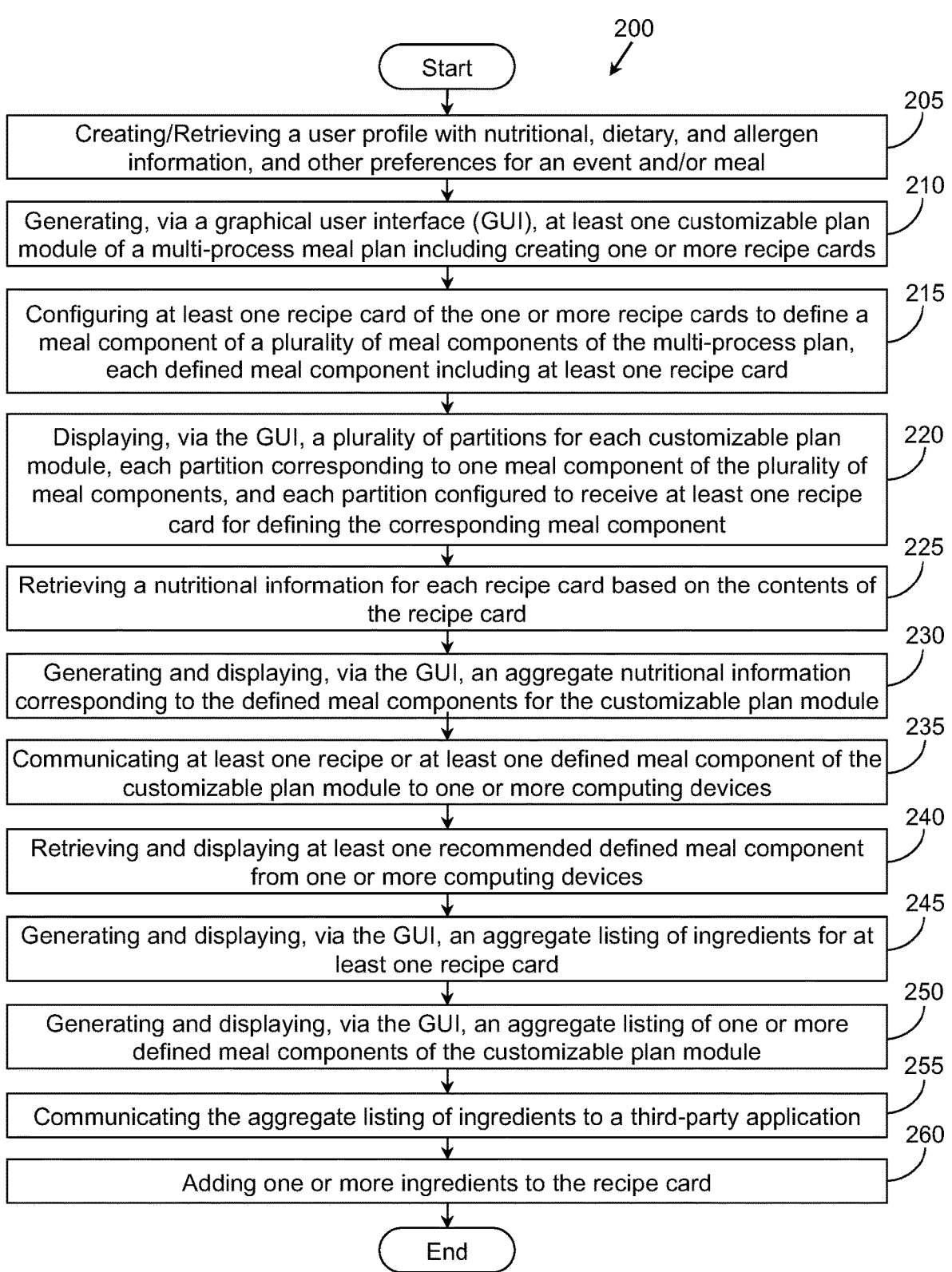

200

Start

Creating/Retrieving a user profile with nutritional, dietary, and allergen information, and other preferences for an event and/or meal — 205

Generating, via a graphical user interface (GUI), at least one customizable plan module of a multi-process meal plan including creating one or more recipe cards — 210

Configuring at least one recipe card of the one or more recipe cards to define a meal component of a plurality of meal components of the multi-process plan, each defined meal component including at least one recipe card — 215

Displaying, via the GUI, a plurality of partitions for each customizable plan module, each partition corresponding to one meal component of the plurality of meal components, and each partition configured to receive at least one recipe card for defining the corresponding meal component — 220

Retrieving a nutritional information for each recipe card based on the contents of the recipe card — 225

Generating and displaying, via the GUI, an aggregate nutritional information corresponding to the defined meal components for the customizable plan module — 230

Communicating at least one recipe or at least one defined meal component of the customizable plan module to one or more computing devices — 235

Retrieving and displaying at least one recommended defined meal component from one or more computing devices — 240

Generating and displaying, via the GUI, an aggregate listing of ingredients for at least one recipe card — 245

Generating and displaying, via the GUI, an aggregate listing of one or more defined meal components of the customizable plan module — 250

Communicating the aggregate listing of ingredients to a third-party application — 255

Adding one or more ingredients to the recipe card — 260

End

RECIPE AND EVENT PLANNING AND DISTRIBUTION TO PROVIDE INTERACTIVE AND REUSABLE CONTENT, E-COMMERCE, AND SOCIAL ENGAGEMENT

CROSS-REFERENCE TO RELATED APPLICATIONS

The entire contents of the following applications are incorporated herein by reference: U.S. Nonprovisional patent application Ser. No. 18/440,538; filed on Feb. 13, 2024; and entitled AUTOMATED MEANS FOR OBTAINING AND PROCESSING INTERACTIVE CONTENT ASSOCIATED WITH VISUAL CONTENT.

TECHNICAL FIELD

The embodiments generally relate to planning and management systems, and more particularly, relates to methods, devices, and systems for creating, displaying, sharing, and interacting with customizable plan modules, each plan module may represent a deck of interactive cards for a predetermined period, for example, one week. Each interactive card of the deck may include a collection of recipes. Users may download, create, modify, or share their recipes contained in each interactive recipe card thereby facilitating personal organization and planning. The customizable plan modules are utilized in an interactive meal and event planning and management system allowing recipe and event planning and distribution to provide interactive and reusable content, e-commerce, and social engagement.

BACKGROUND

Meal planning has steadily developed over the years in line with consumer's growing interest in having a healthy lifestyle through products and services that can be easily integrated within their budget or daily routine. Not surprisingly then companies and businesses providing health-conscious products and online platforms and services to facilitate a healthy lifestyle have thrived. Moreover, consumers have assimilated the abundance of information on ingredients, nutritional facts, recipes, allergies, nutritional requirements, and diets and utilized this understanding to personalize their daily meals and diets. However, existing meal planning systems and methods have several shortcomings. For example, traditional meal planning methods involve users manually entering data for each meal for each day, which can often lack integration with social or professional networks and flexibility for easily reusing planned meals. In order to simplify meal planning, users turn to a website or application to retrieve a desired recipe only to find a static list of recipes that lack personalization or filtering options to match with their preferences, allergies, nutritional requirements, or diet. In order to focus on their preferences, users may then turn to diet and nutrition applications that offer a number of recipe filtering options that meet their personalization needs. However, these applications lack social/group sharing and third-party integrations that would allow users to meal plan with others for different occasions and dietary preferences.

As an alternative, e-commerce integration and meal planning applications were made to allow users to create personalized grocery lists for recipes. However, these applications often lack advance features for converting meal plans directly into shopping lists exportable to retail platforms.

Further, e-commerce integration and meal planning applications can often be restricted to a particular retail platform or recipe/meal database leading users to find themselves sifting through recipes and ingredients individually as social sharing and social interactions made meal/recipe selection a tedious and complex task of searching for available ingredients or recipes for comprehensive meal planning on different retail platforms. Community-based recipe sharing platforms were also created to aid in recipe/meal sharing but these platforms lack structured, customizable meal planning for user allergies, nutritional requirements, or dietary plans. The above examples illustrate only some of the inconveniences experienced by consumers using existing meal planning systems and methods to customize and plan their meals.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale. A complete understanding of the present embodiments and the advantages and features thereof will be more readily understood by reference to the following detailed description when considered in conjunction with the accompanying drawings wherein:

FIG. 2 illustrates one embodiment of a method performed by the system of FIG. 1 for distributing customizable plan modules to a client computing device having an application for processing customizable plan modules;

DETAILED DESCRIPTION

Figure 1:
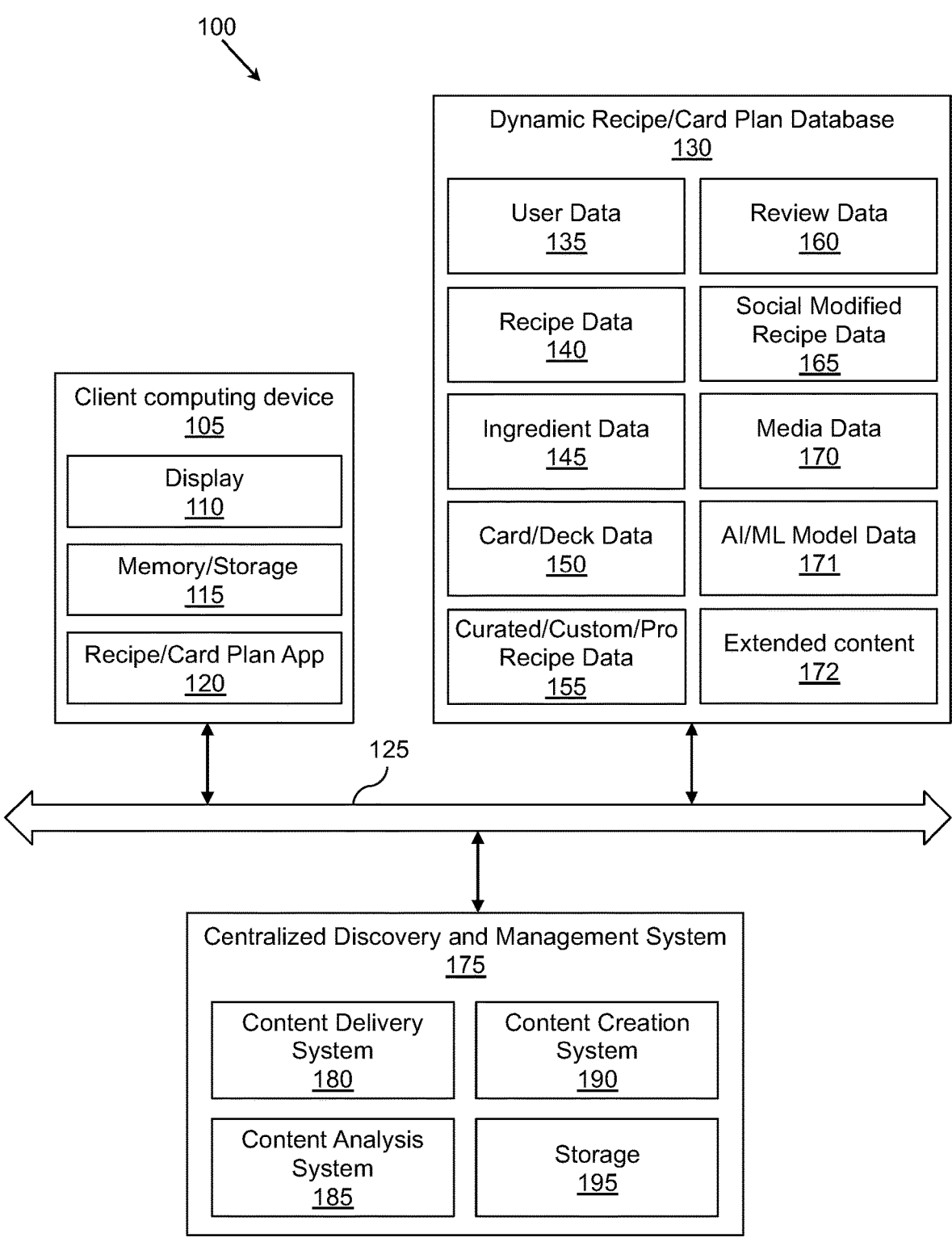
FIG. 1 illustrates one embodiment of a computing system configured to provide an interactive meal and event planning and management system having interactive and customizable plan modules for facilitating personal organization and planning, e-commerce, social engagement, and social collaboration.

Systems and methods are described herein as associated with a computer-implemented automated means for generating, through a graphical user interface (GUI), a customizable plan module for planning an event or meal using one or more interactive cards. As an example, interactive recipe cards may be collected and stored to form a cook-list, or a collection of recipes, similar to creating a music playlist from a collection of songs or audio files from content creators and artists. The customizable plan module allows users to seamlessly configure a multi-process daily or weekly meal plan or an event plan. In one embodiment, one or more interactive recipe cards may be used to create an event or meal plan, each recipe card having at least one ingredient and information for the ingredient, for example, dietary information, allergen information, and nutritional information. The method may further include configuring the recipe card to define a meal component of a plurality of meal components of the multi-process plan, thereby allowing a user to group together multiple recipe cards to define a meal component (meal/recipe), where each meal component includes at least one recipe card. In one embodiment, one recipe card may define one meal component (e.g., meals/recipes for one day of a week) of a card deck (e.g., a deck for a week's worth of meals/recipes). Thus, a plurality of meal components define a card deck or a multi-process plan, and a customizable plan module builds each recipe card that fills a meal component of the card deck. The method may further include displaying partitions for each customizable plan module, each partition corresponding to one meal component, and each partition configured to receive at least one recipe card for defining the corresponding meal component. The method may further include retrieving a nutritional information for each recipe card based on the contents of the recipe card and generating and displaying an aggregate nutritional information corresponding to the defined meal components for the customizable plan module.

Previous meal planning methods included traditional paper-based meal planning where users used a physical planner or paper to store meal plans and recipes. This made meal and recipe planning static and cumbersome and failed to be economical or eco-friendly. The transition to digital meal planners allowed users to modify their recipes and meal planning using meal planning applications, however digital meal planners lacked third-party integration for sharing or selling of meal plans, and often modified recipes and plans needed to be reprinted as a shopping list which made the process of meal planning, sharing, and shopping for ingredients cumbersome. With growing digital presence and user demand, online recipe websites and databases flourished offering users more recipe options, however sifting through websites and databases was often an overwhelming and chaotic process of determining the correct ingredients and directions. Further, since the websites and databases were often static sharing meal plans, shopping for ingredients, and discussing recipe options was difficult and cumbersome. Subsequently, diet apps were introduced to focus on nutrition tracking, however dietary needs only scratched the surface as users sought recipes and meals that can be adapted to their preferences, allergies, and other needs that diet apps failed to address. Another shortcoming of existing meal planning is a lack of professional made and vetted recipes and meal plans that can be discussed and modified in a social community.

With the present interactive meal and event planning and management system offers digital accessibility, including detailed recipe information, recommendations, and modifications, social engagement and collaboration to share, purchase, learn, and modify recipes, generative AI to allow users to discover relevant recipes and recipe cards, and third-party integrations to allow users to modify and integrate their recipes and recipe cards within existing apps and social networks thereby facilitating an economical and eco-friendly meal planning method. Users may select individual recipes to create a recipe card, or a bundle of recipes, each recipe card representing a cooking list of recipes or meals. Users may then create a card deck, or a weekly meal plan, composed of an arrangement of their recipe cards for each day of the week. Further, the interactive meal and event planning and management system allows users to create, reuse, and modify recipe cards and card decks with greater flexibility than typical meal planning apps. Moreover, the interactive meal and event planning and management system facilitates numerous third-party integrations such as, for example, social integration through the sharing and selling of recipes or recipe cards, and retail integration by allowing users to export recipes or recipe cards into shopping lists and directly matching shopping lists with ingredients at retail stores for easy grocery shopping. Further, the interactive meal and event planning and management system provides structured meal planning with a more organized, user-friendly approach to meal planning compared to the often-chaotic nature of sifting through recipe databases. And recipes may be tailored based on user preferences, recipe suggestions, and user interaction history that static websites and databases cannot provide. Moreover, the interactive meal and event planning and management system enables users to share and discuss recipes and recipe cards, fostering a community around cooking and eating and recipe discovery. Further, the interactive meal and event planning and management system offers users adaptable meal planning with customized recipe and recipe card options catering to various dietary needs and preferences in a more user-friendly manner. The interactive meal and event planning and management system goes beyond recipe sharing to include detailed meal planning with recipe cards and card decks that serves not just individual users, but also professionals like dietitians and fitness influencers. Moreover, the interactive meal and event planning and management provides a more integrated and seamless experience from recipe and meal planning to grocery shopping offering a more interactive and engaging process for meal planning and shopping compared to basic e-commerce integration of existing meal planners. These and other features are described herein with reference to the attached figures.

System Embodiment

With reference to FIG. 1, one embodiment of a computing environment is illustrated that is configured with an interactive meal and event planning and management system 100 for facilitating personal organization and planning, e-commerce, social engagement, and social collaboration. In one embodiment, the interactive meal and event planning and management system 100 is configured to include a client computing device 105 and a centralized discovery and management system 175 that includes a content delivery system 180, a content analysis system 185, and a content creation system 190. In some embodiments, data for generating each card may be stored on at least one of a storage 195 of the interactive meal and event planning and management system 100, the dynamic recipe/card plan database 130, and storage 115 of client computing device 105.

In one embodiment, the interactive meal and event planning and management system 100 may be configured to display to a user, at least one customizable plan module, each customizable plan module allows the user to view, create, customize, share, or download a recipe or recipe card in the form of a digital card displayed on a user interface. As an example, users may collect a number of recipes then combine them into a single recipe card (e.g., a day of recipes), recipe cards are then collected to create a card deck that represents a weekly plan. Further, users may access the centralized discovery and management system 175 to discover new recipes, download and refine existing recipes, or refine their own recipes based on feedback and input from other users in the interactive meal and event planning and management system. In one embodiment, the centralized discovery and management system 175 may facilitate social engagement and collaboration by allowing users to add and share, to each recipe card, different ingredients, recipe modifications, and recipe ideas and suggestions based on dietary restrictions, health considerations, allergies, or tastes and preferences. The shared recipe cards may then be distributed, reviewed, and ranked to show user interests, comments, recipes or recipe card recommendations, and other feedback.

As previously described, in one embodiment, the interactive meal and event planning and management system 100 may include, but is not limited to, a computer application/program that includes one or more algorithms configured to generate one or more results based on one or more input values. The algorithm comprises a set of algorithms, models, and/or functions that process user's settings, preferences, interests, inputs, patterns, or behaviors to acquire and display one or more recipe cards based on user input or interaction. The customizable plan modules need not be limited to a recipe card. In one embodiment, one or more customizable plan modules may allow users to view, create, customize, share, or download game cards, event cards, art, crafts, or design cards. The cards may be configured using customizable plan modules to work in any type of system that includes multiple customizable features that can be adjusted or modified to obtain or make a tangible product, prepare for an event, activity, or design a game. For example, customizable plan modules may be used to create a painting card for a painting event that includes various features such as paint colors, brushes, paint brands, and physical media for painting that can be shared, modified, or added by a user, or by a social group or community.

In one embodiment, the interactive meal and event planning and management system 100 may include, but is not limited to, a computer application/program that includes one or more algorithms configured to generate one or more cards. The cards may be generated automatically based on data acquired from one or more databases or through user input from a client device. The algorithm comprises a set of algorithms and/or functions that generate textual and/or visual content based on information and instructions provided by the content creation system and/or content delivery system. As an example, the recipe card may include multiple dynamic links and fields that acquire data from the interactive meal and event planning and management system 100 based on entered ingredients, server size, user preferences, recipe instructions and directions for preparing the recipe. The acquired data for a card may include images, videos, textual information that are periodically or dynamically updated based on the inputted data on the card or based on the current available information for a data/dataset in the interactive meal and event planning and management system 100. Similarly, the client computing device 105 may include, but is not limited to, a computer application/program that includes one or more algorithms configured to retrieve, generate, process, display, or modify cards based on user input. The algorithm comprises a set of algorithms and/or functions that generate textual and/or visual content based on information and instructions provided by the content creation system and/or content delivery system. In some embodiments, the centralized discovery and management system 175 may include, but is not limited to, a computer application/program that includes one or more algorithms configured to generate, process, or display one or more cards using data from a locally and/or remotely accessible database or based on user input.

In one embodiment, one or more cards may require a subscription, a password, or account privileges for access by the interactive meal and event planning and management system 100 using a proprietary application on a client computing device for retrieving and processing the contents of one or more cards. Moreover, the proprietary application may be utilized to retrieve and generated one or more cards, in part or in whole, through a client computing device.

As shown in FIG. 1, the computing environment (e.g., a cloud-computing environment) of the interactive meal and event planning and management system 100 may provide access to remote client devices such as client computing device 105 through one or more network communication channels 125 (e.g., a communication bus, wireless communication, wired networks, combinations of channels, etc.). A client device may access one or more cards or decks via a graphical user interface through display 110 and a recipe/card plan application 120 stored on or running from memory/storage device 115 to retrieve and process the one or more cards. The recipe/card plan application 120 may be configured to retrieve from the interactive meal and event planning and management system one or more cards, each card having one or more customizable plan modules. In one embodiment, retrieving, accessing, or processing a card from the interactive meal and event planning and management system may further load and trigger one or more customizable plan modules associated with each active/dynamic field of the card that is accessed, created, or processed. For example, accessing a listing of ingredients for a recipe card through the recipe/card plan application may load algorithms/functions and display one or more customizable ingredients for the recipe/card including editing ingredients, viewing details for each ingredient, adding ingredients to a shopping cart, and the like. In one embodiment, the one or more customizable plan modules is retrieved from the interactive meal and event planning and management system 100 and loaded into the memory/storage device 115 of client device 105 for processing by the recipe/card plan application 120. In certain embodiments, the one or more customizable plan modules is retrieved from the centralized discovery and management system 175 and loaded into the memory/storage device 115 of client device 105 for processing by the recipe/card plan application 120. In some embodiments, the one or more customizable plan modules may be loaded directly into the memory/storage device 115 of client device 105 for processing by the recipe/card plan application 120.

Each recipe, recipe card, and card deck (hereinafter "card") may include one or more data blocks associated with recipe information, serving size, directions, ingredients, nutritional content, allergy and dietary information, creator (s) information, third-party integration options, uniform resource locator (URLs), media links, and other textual, visual, or interactive content that can be viewed, modified, retrieved, or otherwise processed as desired by a user. Further, the value or contents of each of one or more data blocks associated to each card may be interdependent on one another and may trigger one or more customizable plan modules to execute to request user input, process user input, or display updated information to the user based on user input. Moreover, the value or contents of each of one or more data blocks associated to each card may be interdependent on one or more other cards and may trigger one or more customizable plan modules to execute.

In one embodiment, each customizable plan module may include, but is not limited to, a computer application/program that includes one or more algorithms configured to generate, access, modify, or update a data block for one or more cards. The data blocks may be generated automatically based on data acquired from one or more databases or through user input from a client device. The algorithm comprises a set of algorithms and/or functions that generate textual, visual, or interactive content (dynamic content and/or interdependent content) based on information and instructions provided by the content creation system, content delivery system, or user client device.

The recipe/card plan application 120 may process each data block and retrieve its associated resource, for example, displaying text, images, links, dynamic content, or video contained within one or more data blocks, or executing at least one of: an application, program, browser, code, function, or algorithm contained within one or more data blocks. In one embodiment, the client computing device 105 may display one or more cards allowing a user to cycle through a hierarchical display of each card, for example, swiping/ cycling through from a card deck to a recipe card to a recipe to a shopping list to an ingredient, and vice versa.

The recipe/card plan application 120 may allow content creators to develop cards for the general audience, clients, customers, and other users based on interests, plans, diets, allergies, and other factors. As an example, content creators may be a wide range of users, from individuals and families to dietitians, fitness, trainers, and social media influencers. The recipe/card plan application 120 may allow users to organize cards for each day of the week to ensure individuals or family members have a balanced diet.

The recipe/card plan application 120 may further allow individuals to create, customize, and share access for each card with other individuals for collaborative meal planning within families or groups. The recipe/card plan application 120 may allow card editing and card sharing rights for each user or group that receives a card share or card invite to facilitate collaborative meal planning. In one embodiment, the recipe/card plan application 120 communicates user cards to the centralized discovery and management system 175, the centralized discovery and management system 175 may then analyze user preferences for each card and allow other users and groups to make card edits, card suggestions, or the like in a collaborative environment while maintaining a user objective, for example, a balanced diet for the recipe card or card deck. Moreover, user client devices 105 may be used to distribute cards through the centralized discovery and management system 175 to give other individuals access to help plan for certain events such as Thanksgiving dinners or Birthday parties. Further, the interactive meal and event planning and management system 100 may be used to analyze a user request and/or preferences to retrieve other user or group shared cards. In one embodiment, the recipe/card plan application 120 and/or the interactive meal and event planning and management system 100 may be used to create or distribute themed decks for special events such as summer party meal planning, specific occasions such as New Year meal planning, or general occasions such as Holiday meal planning. Further, with easy access to numerous recipe cards within a dynamic recipe/card plan database 130 and user collaboration and recipe card or card deck sharing within the interactive meal and event planning and management system 100, users can use the recipe/card plan application 120 to simplify and streamline the process of organizing recipe cards and card decks, making the process more efficient and user-friendly.

In one embodiment, the recipe/card plan application 120 may allow users to customize cards with notes, cooking strategies, ingredient adjustments, and specific instructions for obtaining better results. Similarly, other users may share customized and modified cards to the interactive meal and event planning and management system 100 allowing users to reuse and improve their existing cards by incorporating suggestions and modifications from other users. Moreover, users may enhance cards by adding multimedia content to their card through the recipe/card plan application 120 that can visually show how a recipe or meal should look or be prepared.

In one embodiment, the client computing device 105 may include wearable computing devices such as smart watches, smart glasses, or augmented reality (AR) headsets for receiving alerts and quick recipe references. The wearable computing device may be configured to display ingredients, recipes, one or more suggested or popular cards, and other notifications. In certain embodiments, the client computing device 105 may include smart kitchen appliances that include the recipe/card plan application 120 to provide instructions, directions, preconfigured settings for recipes and/or meals, or otherwise facilitate automated recipe or meal preparation guidance (e.g., pre-heat and cooking times). In some embodiments, smart appliances may be integrated with the recipe/card plan application 120 to facilitate automated meal preparation. The recipe/card plan application 120 may further provide options for users to print decks, cards, ingredients, shopping lists or export them as personalized cookbooks or e-books. Moreover, the recipe/card plan application 120 may be configured to implement voice communication and control functionality for hands-free operation to reading card contents in accordance with a predetermined or preconfigured timing for preparing a meal or recipe, for example, reading each task, instruction, direction, or ingredient addition at between 5-200 second intervals. In some embodiments, the recipe/card plan application 120 may be configured to provide real-time interaction during cooking and meal planning process.

As described above, the centralized discovery and management system 175 may be configured to include a content delivery system 180, a content analysis system 185, a content creation system 190, and storage 195. The content creation system 190, the content analysis system 185, and the content delivery system 180, may each include, but not be limited to, a computer application/program that includes one or more algorithms configured to create cards (i.e., data blocks for cards) based on at least one of user client 105 input, recipe/card plan application 120 input, or data from database 130, analyze the contents of each data block of each card, distribute each card (i.e., data block for each card) to one or more client computing devices 105, respectively, as well as storing each card (i.e., data block for each card) in database 130 or storage 195.

In one embodiment, the content delivery system 180 may distribute one or more cards to one or more client computing device 105. As an example, a user may request a recipe card or card deck recommendation for a birthday party through the recipe/card plan application 120. The recipe/card plan application 120 may access the centralized discovery and management system 175, provide user preferences and input. The content analysis system 185 may analyze the user preferences and input and retrieve one or more cards from database 130 and/or storage 195. The centralized discovery and management system 175 may then distribute one or more cards to the recipe/card plan application 120 through the content delivery system 180, the one or more cards are then displayed on the graphical user interface on display 110 of the client computing device 105. In one embodiment, the content delivery system 180 may distribute multimedia and interactive content associated with a card, for example, one or more data blocks of a card may contain videos, images, and other multimedia content as well as providing access to interactive content that is retrieved and loaded for the card within the recipe/card plan application 120. In one embodiment, at least one data block of a card is retrieved by the recipe/card plan application 120 from the interactive meal and event planning and management system 100 and stored locally on the client computing device 105. In some embodiments, one or more data blocks of a card are stored in database 130 and retrieved by the recipe/card plan application 120 using the interactive meal and event planning and management system 100. In one embodiment, the content delivery system 180 may distribute data blocks of a card from a social and professional sharing network. In one embodiment, the content delivery system 180 may distribute data blocks of a card to other connected third-party applications such as a shopping cart application, a diet or nutrition application, a healthcare telemedicine application/system, or any other social or online platform or network.

In one embodiment, the content analysis system 185 may be configured to analyze each data block of each card to determine ingredients, recipe(s), recipe information and modifications, serving size, nutritional content, allergy and dietary information, dietary restrictions, health considerations, cooking directions, cooking notes or strategies, ingredient modifications, and specific instructions for obtaining better results. The content analysis system 185 may be configured to further analyze each data block of each card to determine visual or textual content such as, for example, uniform resource locator (URLs), media links, images, videos, audio content, and other textual, visual, or interactive content that can be viewed, modified, retrieved, or otherwise processed as desired by a user. The content analysis system 185 may further determine for each card, creator(s) information such as profile, bio, links, and individual, group, or family information such as access rights, sharing rights, dietary restrictions, etc. The content analysis system 185 may further determine for each card, user profile verification for determining a user profession or group, such as, for example, dietitian, fitness, trainer, social media influencers, and the like. The content analysis system 185 may further determine for each card, social media interest, engagement, and collaboration, ranking, user views or interests, comments, and other feedback. The content analysis system 185 may be configured to analyze each data block of each card to determine for each card, app, software, or third-party integration options, whereby the recipe/card plan application 120 may add ingredients or data blocks from a card to a software, app, or third-party tools, integrations, apps, or software. In some embodiments, the data blocks may be dynamic such at any change of one data block may trigger a change of another data block. For example, a change of ingredient may trigger a change in the data block for cooking directions, the data block for nutritional content, or a user notification on changing ingredients or recipes in one or more other cards or other data blocks to meet dietary restrictions.

In one embodiment, the recipe/card plan application 120 or the content creation system 190 may be configured to create one or more data blocks for each card, a data block may include: ingredients, recipe(s), recipe information and modifications, serving size, nutritional content, allergy and dietary information, dietary restrictions, health considerations, cooking directions, cooking notes or strategies, ingredient modifications, and specific instructions, visual or textual content such as, for example, uniform resource locator (URLs), media links, images, videos, audio content, and other textual, visual, or interactive content, creator(s) information such as profile, bio, links, and individual, group, or family information such as access rights, sharing rights, dietary restrictions, etc., a user profession or group, such as, for example, dietitian, fitness, trainer, social media influencers, and the like, social media interest, engagement, and collaboration, ranking, user views or interests, comments, and other feedback, and app, software, or third-party integration options.

Moreover, the interactive meal and event planning and management system 100 may process the user content share using, for example, machine learning (ML) and/or artificial intelligence (AI) to determine how to label the user content share and to which participants to distribute the user content share. For example, a convolutional neural network may be implemented to determine one or more objects displayed or emphasized in one or more data blocks of an image, video, or visual content. The objects may be compared and matched with data blocks of another card in the database 130. Moreover, metadata from images or video content captured within the computing device may be processed by the interactive meal and event planning and management system 100 or within recipe/card plan application 120 on computing device 105 to verify, for example, recipes, ingredients, colors, textures, consistency, type of meal (e.g., soup, broth, stew, salsa, etc.,) or the like, and may be used by content analysis system 185 to determine the meal type, calories, nutritional content, dietary or allergen information, and the like. In one embodiment, the centralized discovery and management system 175 may include any number of microprocessors, microcontrollers, graphics processing units (GPUs), central processing units (CPUs), quantum processing units (QPUs), artificial intelligence processing units (AI PUs), neural processing units (NPUs), tensor processing units (TPUs), analog circuitry, or the like that may be programmed to execute computer-executable instructions for implementing aspects of this disclosure.

The dynamic recipe/card plan database 130 may include user data 135, recipe data 140, ingredient data 145, card/deck data 150, curated/custom/professional recipe data 155, review data 160, social modified recipe data 165, media data 170, and AI/ML model data 171, and extended content 172. The user data 135 may include user credentials, preferences, tastes, allergy and dietary information, health information and concerns, nutritional requirements, age, and the like. The recipe data 140 may include recipe name, ingredients, instructions, directions, creator/group information, allergen, dietary, or nutritional information, cooking times, instructions, and equipment information, serving size, and the like. The ingredient data 145 may include allergy and dietary information, health information and concerns, nutritional facts, serving size, and the like for each ingredient. The card/deck data 150 may include one or more recipe cards or one or more card decks that make up a meal for a single day, or a longer period of time (e.g., week, bi-week, month, etc.,), respectively. The card/deck data 150 may include preconfigured recipes by users, community member, social groups, or professionals such as dietitians and trainers. The card/deck data 150 may be configured for a specific diet, nutritional plan, or health condition or age group. For example, card/deck data 150 may include recommended recipe cards and card decks for infants, toddlers, or children recommended and verified by healthcare providers. The curated/custom/professional recipe data 155 may include one or more card decks for multiple weeks that includes a sequence of recipe cards and card decks that individuals may subscribe to through, for example, a content creator group or channel that focuses on achieving an individual's dietary goal or desire to maintain a healthy diet. The review data 160 may include customer or user reviews, rankings, and ratings on card decks, recipe cards, content creator channels or groups, and the like. The social modified recipe data 165 may include recipe cards that are configured and shared by users for a community or public audience. The media data 170 may include textual, visual, or audio content for a recipe card, card deck, or content creator channel or profile.

The AI/ML model data 171 data may include various LLM models, generative AI, or natural language processing (NLP) to facilitate searching for specific recipe cards, ingredient substitutes, card decks, cooking information, and other information for preparing a recipe based on user's preferences, tastes, diet, health, etc. In one embodiment, a user can generate cards or decks based on individual characteristics (e.g., diets, allergens, macro targets, etc.,), occasions (e.g., Christmas, Thanksgiving, etc.,), meals, or something else never tried before. The recipe/card plan application 120 and/or the interactive meal and event planning and management system 100 may learn the user's unique tastes and food ontology and analyze database 130 to help recommend or discovery recipe cards and card decks personalized for the user. Thus, an entire card deck can be generated by the interactive meal and event planning and management system 100 by processing user preferences using AI/ML model data 171 and exporting recipes and ingredients to a user's third-party application, for example, shopping app or online grocery store to automate meal-planning and shopping.

Extended content 172 may include media and/or visual content for using cooking equipment, equipment settings, and other information that can be applicable to preparing a recipe from a card. For example, a card may have a recipe for beef brisket prepared by smoking the brisket using a smoker. The recipe may have instructions stating "smoking" beef brisket for 4 hours. Upon creating the card (or analyzing the card), the content creation system 190 and/or content analysis system 185 may determine the term "smoking" as a keyword for extended content information, and the textual information of "smoking beef brisket" may be automatically updated by the interactive meal and event planning and management system 100 to add a link and/or a note such as "smoking (see smoker equipment instructions)", the link may direct users to a video instruction and visual or textual guides on smoker equipment care, safety instructions, proper handling, usage, and cleaning, and other useful information for preparing a recipe using, for example, a smoker or other cooking equipment.

Method for Creating Visual Content Embedded with Code for Interactive Content FIG. 2 illustrates one embodiment of a method 200 performed by the system of FIG. 1 for creating interactive meal and event planning and management modules for facilitating personal organization and planning, e-commerce, social engagement, and social collaboration. The method may include various programs, algorithms, logic, applications, and systems for creating interactive meal and event planning and management modules, retrieving content for each module, displaying and/or distributing the content of each module, and processing and retrieving additional modules and/or additional content for each module. Each block shown in FIG. 2 may represent one or more processes, methods, or subroutines, carried out in the exemplary method. For explanatory purposes, method 200 will be described with reference to FIGS. 1, 3A-3B, 4A-4F, and 5A-5B which show example embodiments of carrying out the method of FIG. 2 for creating interactive meal and event planning and management modules, retrieving content for each module, displaying and/or distributing the content of each module, and processing and retrieving additional modules and/or additional content for each module. Method 200 may be used independently or in combination with other methods or processes for creating interactive meal and event planning and management modules, retrieving content for each module, displaying and/or distributing the content of each module, and processing and retrieving additional modules and/or additional content for each module. Method 200 may be performed by the recipe/card plan application 120 of the client computing device 105, the centralized discovery and management system 175, the interactive meal and event planning and management system 100, or any combination thereof.

Figures 3A, 3B, 4A, 4B:
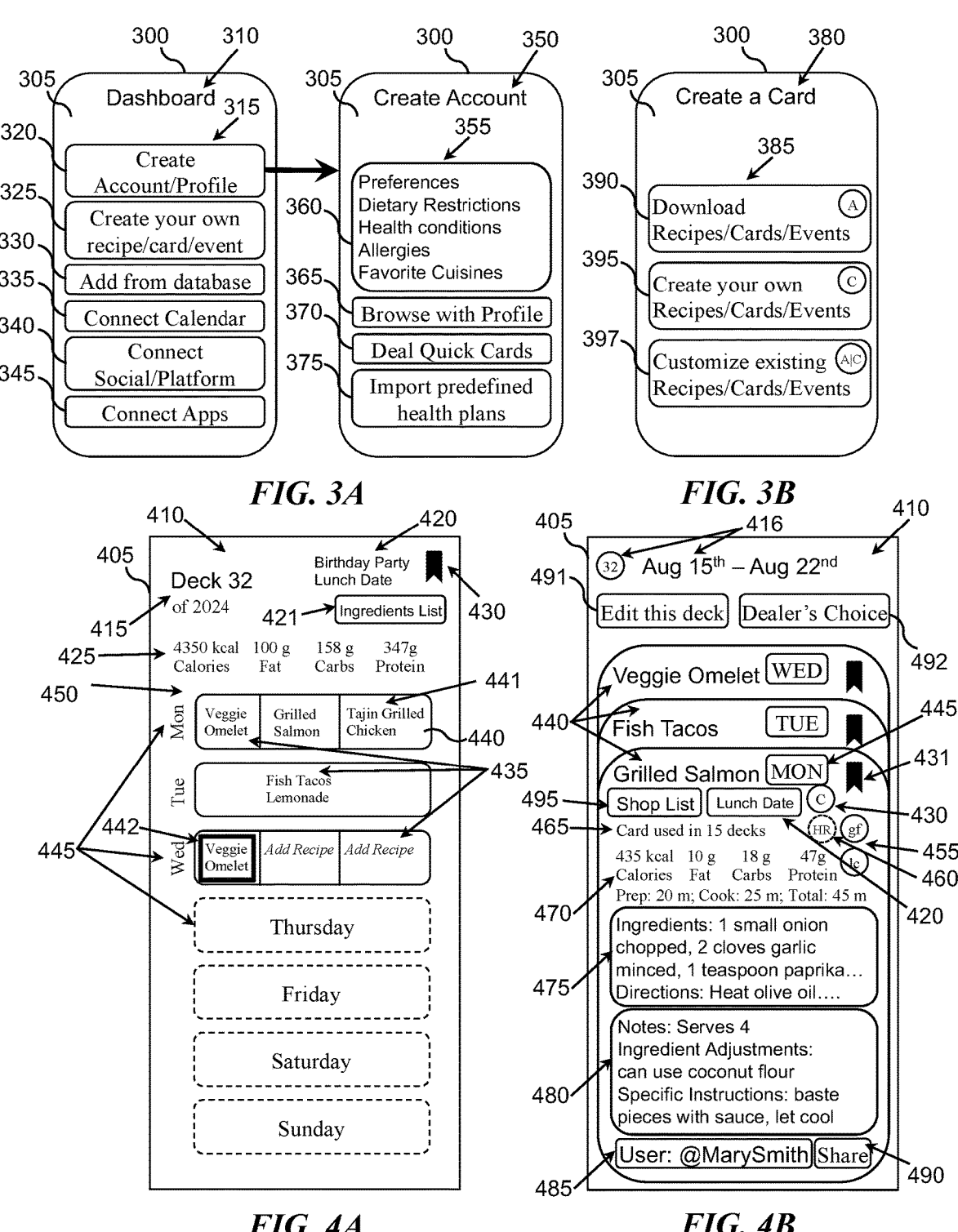
FIG. 3A illustrates one embodiment of a user interface displaying a user configuration and settings screen for configuring preferences for accessing and processing customizable plan modules from the interactive meal and event planning and management system of FIG. 1.
FIG. 3B illustrates one embodiment of a user interface displaying a user options screen for accessing and processing customizable plan modules from the interactive meal and event planning and management system of FIG. 1.
FIG. 4A illustrates one embodiment of a user's weekly card deck partially completed with selectable recipe options for each part of each day of the week, as an example, configured using customizable plan modules from the interactive meal and event planning and management system of FIG. 1.
FIG. 4B illustrates one embodiment of a user's daily card deck created and configured using the interactive meal and event planning and management system of FIG. 1, and arranged into the customizable plan module of FIG. 4A.

Method 200 begins at block 205, the GUI allows for retrieval or creation of a user content, settings, location, profile, reviews, messages, and the like. As one example, the client device may connect to a local server of the interactive meal and event planning and management system 100, the system 100 to retrieve or create user settings, information, and content. The user profile make include, for example, nutritional, dietary, and allergen information, and other preferences for an event, recipe, card deck, and/or meal. In some embodiments, users may share and access content with other users and content creators, and/or content creators may share and access content with other content creators and users. The interactive meal and event planning and management system may allow a client device to create and define an administrator account that may be associated with one or more user and content creator accounts. The content and data for each of the plurality of accounts may be owned by and associated to one administrator account. The user interface shown in FIGS. 3A-3B, 4A-4F, and 5A-5B may refer to an administrator account, however the interface, navigation, content, and communication means and functions can equally apply to individual content creator or user accounts. As one example, FIG. 3A illustrates a graphical user interface (GUI) 305 of a client device 300 for displaying a user home screen or dashboard 310 and options 315 for creating, retrieving, or configuring, for example, a user account/ profile, their own recipe, recipe card or card deck (e.g., meal), or event plan (RME), an RME from database and adding it to their account, as well as options for connecting their account and/or plans to a calendar, social and online platforms, and third-party applications. Each RME includes one or more recipe cards (i.e., one or more recipes having one or more ingredients), and an RME may be a cooking list of recipes that may be arranged in any order and assigned to any card deck. FIG. 3A is described in more detail below.

For example, FIG. 3A illustrates one embodiment of a user interface displaying a user configuration and settings screen for configuring preferences for accessing and processing customizable plan modules from the interactive meal and event planning and management system of FIG. 1. FIG. 3A shows one embodiment of a user account screen 350 in a graphical user interface (GUI) 305 for displaying a user dashboard 310 on a client device 300. The GUI 305 may list numerous options 315 that may allow a user to create a profile, create, download, or share one or more recipe cards for an event, occasion, or meal type, or view or create RMEs, or any combination thereof. In some embodiments, RMEs ("RME data") may include a recipe having one or more ingredients. For example, lemonade, an apple, an orange, tacos, stews, soup, and other consumables may be an RME. Further, RMEs also include a combination of recipes, for example, Tacos and lemonade, vegetable broth and raw chicken, and the like. Moreover, RMEs may include an event, occasion, or meal type or preparation thereof, for example, a low carb meal RME may include preparing oatmeal for breakfast, preparing vegetable broth and raw chicken for lunch oatmeal, and preparing Caesar salad, baked salmon, and red wine for dinner. In one embodiment, and RME may include planning and preparation items, materials, ingredients, directions, and information for planning an event, occasion, or meal type, and/or meal, for example, preparing a birthday party may include location and information for planning a venue, purchasing balloons and party hats, and preparing a meal. Each RME may be displayed on the GUI 305 of the client device 300 as one or more cards ("RME cards") containing information for the card deck, recipe card, recipe, ingredient, meal, occasion, or event. Continuing the example above, RME cards may include recipe card and recipe information and venue information, whereby each or all cards may be shared with birthday attendees allowing recipients to confirm the venue, time, location, recipes, ingredients, and meals, and the like, for example.

In one embodiment, a user may select to create RME 325, for example, through the recipe/card plan application 120 of the client device 105, or by accessing an online platform or service configured to include the centralized discovery and management system 175, or the interactive meal and event planning and management system 100, or any combination thereof. As an example, the client device 105 may display one or more customizable plan modules (as shown in FIGS. 4A-4B) that allow a user to add RME data, as individual data blocks, that may include one or more ingredients, instructions, directions, notes, specific instructions, and content creator profile link or information, as well as information on the event, venue, or occasion. Further, RME data may be collected and configured to create RME cards. The RME cards may be added to one or more customizable plan modules to create a weekly, biweekly, monthly, or annual plan of recipes, meals, or events. Upon creating the RME, the centralized discovery and management system 175, or the interactive meal and event planning and management system 100, or combination thereof, may retrieve nutritional content information, allergen and diet information, and the like for each ingredient. Further, in cases where a public event location or venue is defined, general contact, location, direction, and operating hour information may be retrieved for the event or venue as defined by the user/content creator on the RME card or through a social and/or online website, service, or platform. In some embodiments, if the location or venue is a well-known public venue, then the venue and event information may be collected and stored in the extended content 172 of database 130. In many embodiments, the content creator of the RME card may restrict access and further designated users that can view and access venue or location information for the event.

In certain embodiments, a user may select to add RME 330 to their account, for example, through the recipe/card plan application 120 of the client device 105, or by accessing an online platform or service configured to include the centralized discovery and management system 175, or the interactive meal and event planning and management system 100, or any combination thereof, thereby accessing database 130 to retrieve one or more RME cards or RME data. In some embodiments, RME cards or RME data may be obtained from content creators' RME data or RME cards, or other platforms and services such as social network platform or online services and third-party applications. Further, as described above in FIG. 1, AI/ML model data 171 and curated/custom/pro recipe data 155 may be accessed by the client device 105 through the interactive meal and event planning and management system 100 to selectively add RME cards or RME data to the user account.

In one embodiment, a user may select to connect one or more calendars 335, a social network platforms or online services 340, or third-party apps 345 to their account. Users may select to share RME data or RME cards through the recipe/card plan application 120 of the client device 105 to one or more platforms or services as well as import data for creating or configuring one or more existing RME cards.

In one embodiment, a user may select to create account/ profile 320, for example, through the recipe/card plan application 120 of the client device 105, or by accessing an online platform or service configured to include the centralized discovery and management system 175, or the interactive meal and event planning and management system 100, or any combination thereof, to create the user account and profile. Upon selection of create account/profile 320 on the GUI 305, the client device 300 may display the user account/profile creation page 350 with user profile/account options 355. The user may configure their preferences 360 selecting, for example, their age, weight, body mass index (BMI), diet, dietary restrictions, allergens, health conditions, tastes, and favorite cuisines. Moreover, the user may set preferences 360 to limit or restrict certain ingredients to a certain frequency, for example, limiting fatty or high caloric foods to once a month. Upon creation of an account/profile, the user may select to browse for RMEs 365 in database 130 based on their defined preferences 360. Alternatively, the user may select deal quick cards 370 which presents one or more RMEs as cards for the user to add or save to their account. Moreover, the user may select predefined health or diet plans 375 that may be preconfigured based on common dietary, allergic, or health conditions. For example, selecting predefined health or diet plans 375 may present preset preferences for users who are diabetic, recovering from a medical procedure, health condition, or injury, or users who have allergies to peanuts or acidic foods, as an example.

FIG. 3B illustrates one embodiment of a user interface displaying a user options screen for accessing and processing customizable plan modules from the interactive meal and event planning and management system of FIG. 1. FIG. 3B shows one embodiment of a user selecting to create RME card 325, for example, through the recipe/card plan application 120 of the client device 105, or by accessing an online platform or service configured to include the centralized discovery and management system 175, or the interactive meal and event planning and management system 100, or any combination thereof, to create an RME card. Upon selection of create RME card 325 on the GUI 305, the client device 300 may display the RME card creation page 380 with RME creation options 385. The RME creation options 385 may include download RMEs 390 for retrieving RMEs or RME data, create RMEs 395 for displaying one or more customizable plan modules to allow a user to create and configure an RME, or customize existing RMEs 397 that may retrieve (e.g., using client device) one or more RMEs from database 130, client storage 115, or the centralized discovery and management system 175 storage 195, or any combination thereof.

In some embodiments, each RME creation option 385 may include a type indicator that displays whether the RME card is an original RME card, labeled as "A", a modified RME card from an original, labeled as "A|C", or a custom RME card, labeled as "C". For original RME cards, "A" RME cards, users download a community accepted or system defined recipe. For modified RME cards, "A|C" RME cards, users download a community modified, user modified, or content creator modified card. For custom RME cards, "C" RME cards, users create their own card with their own ingredients. Each RME card may include attribution information, community information, or author information, and certifications for validating whether a recipe or meal is approved for a specific health condition, age, dietary, allergen, or nutrition requirement, as an example.

With reference again to FIG. 2, at block 210, the GUI allows generating at least one customizable plan module of a multi-process meal plan including creating one or more recipe cards. In one embodiment, each recipe card of the one or more recipe cards includes at least one of: ingredient information, dietary information, allergen information, and nutritional information. In some embodiments, RME cards include one or more data blocks for adding RME data to create the RME card. As an example, a data block may be a list of ingredients for making the recipe, a list of directions, a list of specific instructions, a list of nutritional information, dietary information, and the like. As one example, FIG. 4A illustrates one embodiment of a graphical user interface (GUI) 405 of a client device for displaying a customizable plan module 410, each customizable plan module 410 receives one or more RME cards (as shown in FIG. 4B), and each RME card includes RME data (data blocks). Each RME card may include several data blocks for inputting content or information for a card deck, recipe card, recipe, ingredient, meal, occasion, meal type, event, and the like. The inputted content may require retrieving additional information or content by the recipe/card plan application 120 of the client device 105, the centralized discovery and management system 175, or the interactive meal and event planning and management system 100, or any combination thereof. For example, adding an ingredient of 1 clove of garlic may trigger the interactive meal and event planning and management system 100 to retrieve nutritional information for 1 clove of garlic. Further, FIG. 4B illustrates one embodiment of a user's daily card deck (RME cards) created and configured using the interactive meal and event planning and management system of FIG. 1, arranged, and ordered into the customizable plan module of FIG. 4A. FIGS. 4A-4B are described in more detail below.

For example, FIG. 4A illustrates one embodiment of a user's daily card deck created and configured using customizable plan modules from the interactive meal and event planning and management system of FIG. 1. FIG. 4A shows one embodiment of a customizable plan module 410 that may be used to order and arrange one or more RME cards to create a daily, weekly, monthly, or annual plan of events or meals by adding RME cards (i.e., recipe cards) to each day of a card deck representing the week, month, etc. In one embodiment, the customizable plan module 410 may include a label 415 for the recipe cards that may be used to plan an event or occasion in a given week. For example, the customizable plan module 410 corresponds to "week 32 of 2024", labeled as "Deck 32 of 2024" or simply "32". In certain embodiments, the customizable plan module 410 may include one or more labels 420 defined using the by the user or collected by the client device 105 or system 100 as an aggregate of events of each RME card label for the week, for example, a "lunch date" and a "birthday party" may be collected from each RME card label of FIG. 4B. In one embodiment, the customizable plan module 410 may include a plurality of partitions for 435 for each time frame 445 of a period, for example, recipe card having one or more recipes for breakfast, lunch, and dinner for each day of "week 32". The partitions may be increased or decreased as needed to accommodate a half day event, for example, a housewarming party, or multiple events of a shorter duration such as snacks or brunches throughout a day. As an example, RME cards 440 may be added to an RME deck 450 to complete a sequences of recipes or cooking list for "week 32 of 2024". Upon confirming their RME cards 440 selection within each customizable plan module 410, users may select save plan 430 to save the RME deck 450. Further, upon adding or configuring each RME card 440, the interactive meal and event planning and management system 100 may update a nutritional information 425 for the RME deck 450.

Figure 5A:
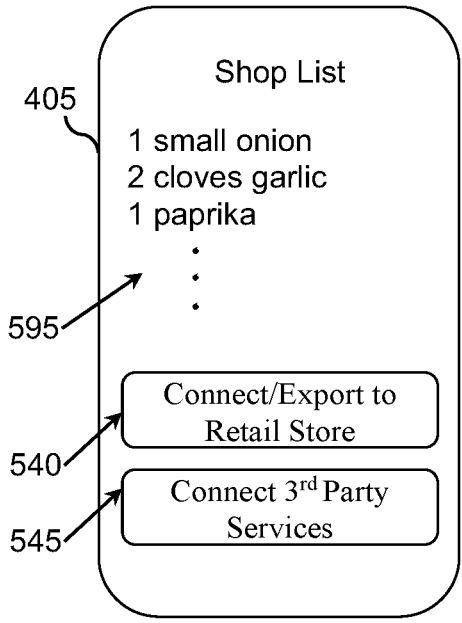
FIG. 5A illustrates one embodiment of a grocery shopping list constructed from the user's card deck by the interactive meal and event planning and management system of FIG. 1 that can be communicated to third-party apps or online stores to streamline grocery shopping and/or other e-commerce functions.

With reference again to FIG. 2, at block 215, the GUI allows for configuring at least one recipe card of the one or more recipe cards to define a meal component of a plurality of meal components of the multi-process plan, each defined meal component including at least one recipe card. As one example, FIG. 4B illustrates the GUI 405 displaying an opposite side, for example, of the RME deck 450 for adding, modifying, or removing each RME card 440. In one embodiment, the GUI 405 may display, upon selection of the occasion 420, the partition 435, the RME card 440, or the time frame 445, a card deck view of the customizable plan module 410 with each RME card 440 grouped together by the occasion 420, the partition 445 (e.g., day of week), the time frame 445 (e.g., breakfast for the week), or a combination thereof. Further, the card deck view may include alternate label 416 that includes the week "August 15th-August 22nd" and deck number "32". In one embodiment, the RME card 440 may include a card type indicator 430 that displays whether the RME card 440 is an original RME card, labeled as "A", a modified RME card from an original, labeled as "A|C", or a custom RME card, labeled as "C". Further, users may configure RME cards 440 by labelling them for an occasion 420, and for health conditions 445, for example, dietary, allergen, or nutritional requirements. Users may then assign RME cards 440 to one or more partitions 435 or time frames 445 to define a meal component 441 for that time period (e.g., for lunch) that includes at least one ingredient, recipe, or meal for that time period. Further, users may save the card 431 to their RME deck 450 or user account. Each RME card 440 may include a user configurable list of ingredients 475 and directions, and recipe notes 480 that may include serving size, ingredient adjustments, and specific instructions. The user may select to edit the deck 491 to add, remove, or modify RME cards 400, or request a randomly selected RME deck 450 by choosing random deck 491 labeled as "Dealer's Choice" whereby the interactive meal and event planning and management system 100 randomly selects one or more RME cards 440 based on the user's preferences and settings. In one embodiment, the ingredients for each RME card 440 or all ingredients for the RME deck 450 may be added to a shopping list 495 as shown in FIG. 5A and further described below.

With reference again to FIG. 2, at block 220, the GUI allows for displaying, a plurality of partitions for each customizable plan module, each partition corresponding to one meal component of the plurality of meal components, and each partition configured to receive at least one recipe card for defining the corresponding meal component. As one example, FIG. 4B illustrates the GUI 405 displaying several RME cards 440, each assigned to a partition 435 and a time frame 445 for defining a meal component 441 for the corresponding partition. In one embodiment, RME cards 440 may be assigned to multiple partitions 435 and multiple time frames 445. Further, upon assigning a recipe or recipe card (e.g., meal) to a partition 435, the partition 435 may be defined as a meal component 441. Each partition 435 may serve as a placeholder for a meal component 441, upon adding at least one recipe card to the partition 435, a meal component 441 is then defined. In one embodiment, meal components may include a plurality of RME cards 440, for example, lemonade RME card and Fish Taco RME card may define a meal component 441.

With reference again to FIG. 2, at block 225, the GUI allows for retrieving a nutritional information for each recipe card based on the contents of the recipe card. As one example, FIG. 4B illustrates the GUI 405 displaying nutritional content 470 obtain by the interactive meal and event planning and management system 100 and database 130 from each ingredient 475 included in the RME card 440. Moreover, the user may define a dietary information 455 shown on RME cards 440 as indicators, for example, glucose free "gf", low calorie "lc", and the like. In one embodiment, the interactive meal and event planning and management system 100 may acquire at least one of a nutritional content 470, and a dietary information 455 from the database 130 and add the information to the RME card 440.

With reference again to FIG. 2, at block 230, the GUI allows for generating and displaying an aggregate nutritional information corresponding to the defined meal components for the customizable plan module. In one embodiment, the interactive meal and event planning and management system 100 may generate the aggregate nutritional information. As one example, FIG. 4A illustrates the GUI 405 displaying nutritional content 425 for the RME deck 450 as obtained by the interactive meal and event planning and management system 100 and database 130 from each ingredient 475 of each RME card 440 (i.e., meal component 441). In some embodiments, the interactive meal and event planning and management system 100 may acquire additional information for the user based on user preferences and settings to indicate a potential health concern, for example, the meal component 441 of time frame 445 "Wed" includes an additional RME card 440 for a veggie omelet, the interactive meal and event planning and management system 100 may determine that user's cholesterol intake is above a threshold, and a box or warning label 442 may be attached to the meal component 441.

Figures 4C, 4D, 4E, 4F:
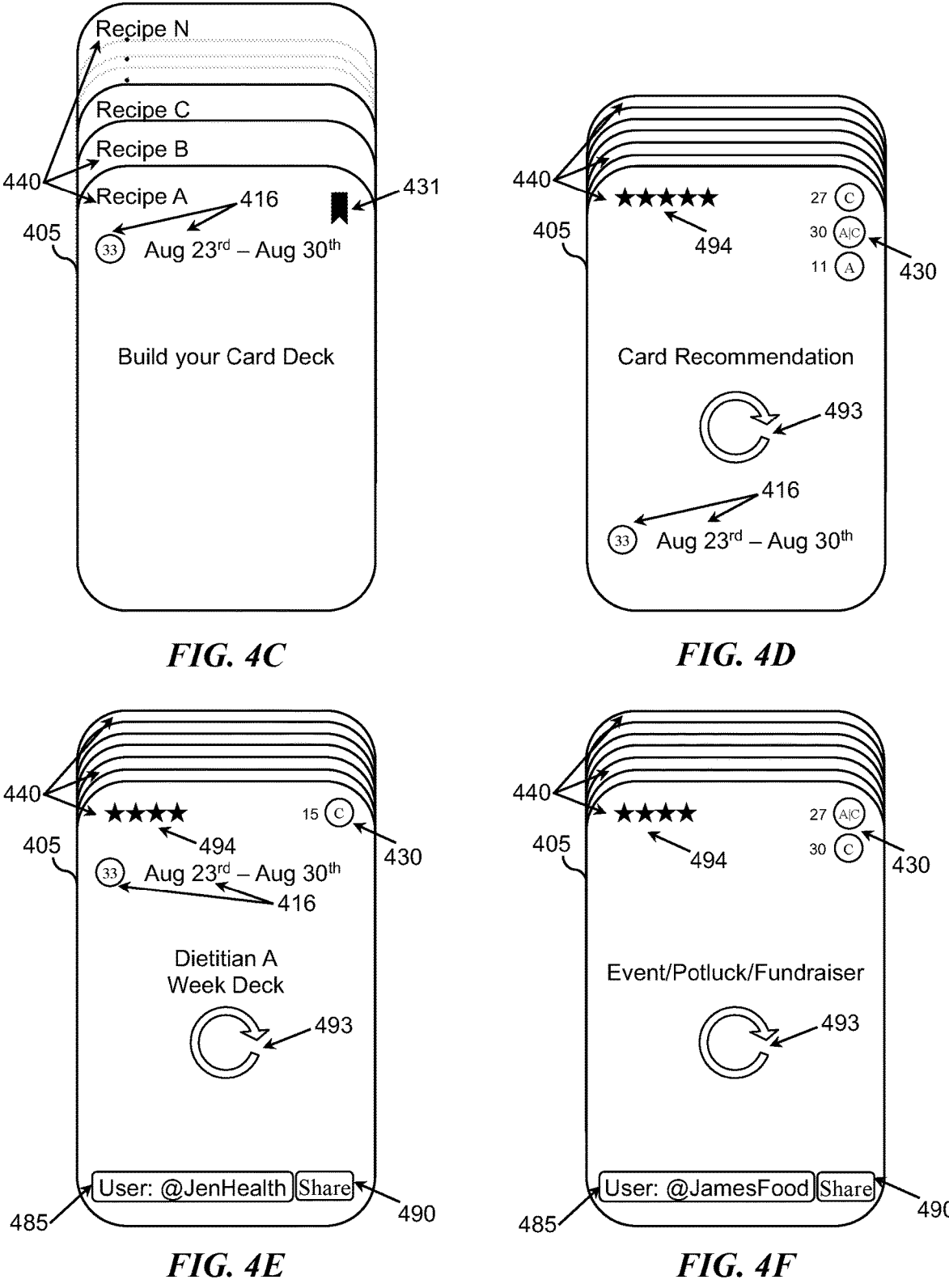
FIG. 4C illustrates one embodiment of numerous customizable plan modules displayed by the interactive meal and event planning and management system of FIG. 1 for building a user's daily card deck.
FIG. 4D illustrates one embodiment of numerous customizable plan modules displayed by the interactive meal and event planning and management system of FIG. 1 for building a user's daily card deck based on recipe card recommendations determined from user preferences.
FIG. 4E illustrates one embodiment of numerous customizable plan modules displayed by the interactive meal and event planning and management system of FIG. 1 for building a user's daily card deck based on recipe card recommendations determined by professionals, nutritionists, dietitians, doctors, and other healthcare providers based on, for example, user preferences.
FIG. 4F illustrates one embodiment of numerous customizable plan modules displayed by the interactive meal and event planning and management system of FIG. 1 for building a user's daily card deck based on curated, popular, user saved, or suggested recipe cards (e.g., meal plans) for various events.

With reference again to FIG. 2, at block 235, the GUI allows for communicating at least one recipe or at least one defined meal component of the customizable plan module to one or more computing devices. As one example, FIG. 4B illustrates the GUI 405 displaying a creator information 485 that may be added by a user, client device, or the interactive meal and event planning and management system 100 that may provide a viewer of an RME card with additional information on the content creator and their content. Moreover, the viewer of an RME card may choose to share 490 one or more RME decks 450 or one or more RME cards 440 to other users and content creators. Further, each RME card 440 may be ranked or rated 460 based on card popularity 465 and/or user reviews 494 (FIGS. 4D-4E).

With reference again to FIG. 2, at block 240, the GUI allows for retrieving and displaying at least one recommended defined meal component from one or more computing devices. FIGS. 4C-4F illustrate example recipe (e.g., recipe card or card deck) recommendations for building a user's customizable plan module (daily card deck) based on, for example, user preferences, professionals, nutritionists, dietitians, doctors, and other healthcare providers, as well as card decks based on curated, popular, user saved, or suggested recipe card or card decks for various events. Referring to FIGS. 3A-3B and 4C-4F, upon user selection to create a card 325 with RME creation options 385, or add a card 330 from the database, the GUI 405 may display options for selecting an RME deck 450 or selecting one or more RME cards 440 to build an RME deck 450. For example, FIG. 4C illustrates the GUI 405 displaying an option for users to add RME cards 440 for a selected customizable plan module 410 of "week 33". As another example, FIG. 4D illustrates the GUI 405 displaying an option for users to obtain recipe or card deck recommendations by cycling recipe cards/card decks 493 to find the desired recipe or card deck and/or toggling meal type indicators 430 to further filter meal types. Further, FIG. 4E illustrates the GUI 405 displaying an option for users to select RME cards 440 and RME deck 450 from a particular content creator "JenHealth" with profession of being, for example, a dietitian labeled as "Dietitian A". Moreover, FIG. 4F illustrates the GUI 405 displaying an option for users to search and select an RME card or RME deck for particular event from a content creator, for example, content creator "JamesFood". In one embodiment, users may search, filter, and select RME cards and RME decks from the example FIGS. 4C-4F, allowing them to pick and choose each customizable plan module 410 for each weekly meal plan or event.

Figure 5B:
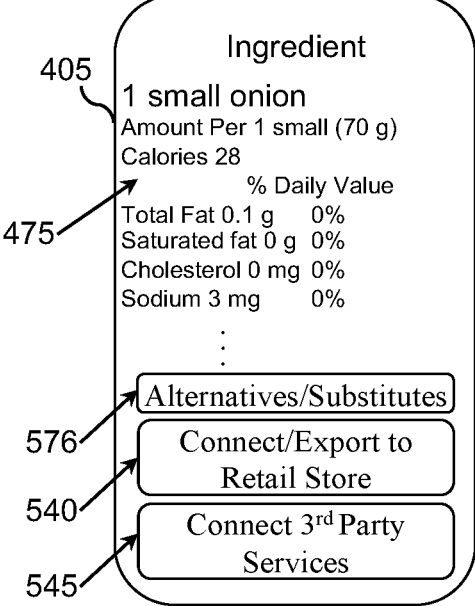
FIG. 5B illustrates one embodiment of an ingredient detail displayed in response to a user request for ingredient information by the interactive meal and event planning and management system of FIG. 1 that can be communicated to third-party apps or online stores to streamline grocery shopping and/or other e-commerce functions.

With reference again to FIG. 2, at block 245, the GUI allows for generating and displaying an aggregate listing of ingredients for at least one recipe card. In one embodiment, the interactive meal and event planning and management system 100 may generate the listing of ingredient for at least one recipe card. As one example, FIG. 4B illustrates the GUI 405 displaying ingredient information 475 whereby upon user selection to configure ingredient information 475 through client device 105, the GUI 405 may display detailed ingredient information as shown in FIG. 5B. Referring to FIG. 5B, users may further select and modify each ingredient, where the ingredient information 475 is a configurable data block that can modified by the user or through predetermined alternative ingredients 576 obtained by the interactive meal and event planning and management system 100 or database 130. As described above, the user account may be connected to one or more social network or online services or platforms to enable sharing of RME data (data blocks) with other software, applications, and third-party services. In one embodiment, shopping lists and ingredients 475 for an RME card 440 or RME deck 450 may be added to, for example, one or more retail store applications or online services 540, and/or to one or more third-party applications 545. Further, referring to FIG. 5A, the ingredients for individual RME cards 440 may be added to a shopping list 595 that may be exported to one or more social network or online services or platforms to enable sharing of RME data (data blocks) with other software, applications, and third-party services.

With reference again to FIG. 2, at block 250, the GUI allows for generating and displaying, via the GUI, an aggregate listing of one or more defined meal components of the customizable plan module. In one embodiment, the interactive meal and event planning and management system 100 may generate the aggregate listing of one or more defined meal components. As one example, FIGS. 4A-4B illustrate the GUI 405 displaying a plurality of defined meal components 441 in the customizable plan module 410, and each RME card 440 may be aggregated and displayed on the GUI 405.

With reference again to FIG. 2, at block 255, the GUI allows for communicating the aggregate listing of ingredients to a third-party application. As one example, FIG. 4A illustrates the GUI 405 displaying a plurality of defined meal components 441 in the customizable plan module 410, and each RME card 440 may be aggregated and displayed on the GUI 405. In some embodiments, the interactive meal and event planning and management system 100 may populate an ingredients list 421 that aggregates a listing of ingredients for all RME cards 440. Referring to FIG. 5B, the ingredients for each RME deck 450 or RME card 440 may be added to a third-party application 545.

With reference again to FIG. 2, at block 260, the GUI allows for adding one or more ingredients to the recipe card. As one example, FIG. 5B illustrates the GUI 405 displaying a plurality of ingredients as a data block whereby each ingredient can be modified as desired by the user through the client device and recipe/card plan application 120.

Definitions

A "RME card", "recipe", "recipe card", "data block", "meal", or "RME" as used herein includes, but is not limited to, any singular or plurality of data corresponding to a recipe for any occasion or event. In cases of events, the recipe card may include or link to or otherwise communicate, for an event, information for a general contact, location, direction, operating hours, and other public, private, or business information necessary to coordinate or plan an event. For recipes, recipes cards, or card decks, any singular or plurality of data corresponding to dietary information or restrictions, allergens, nutritional information, recipes, ingredients, notes, and the like, for example.

Computing Device Embodiment

Figure 6:
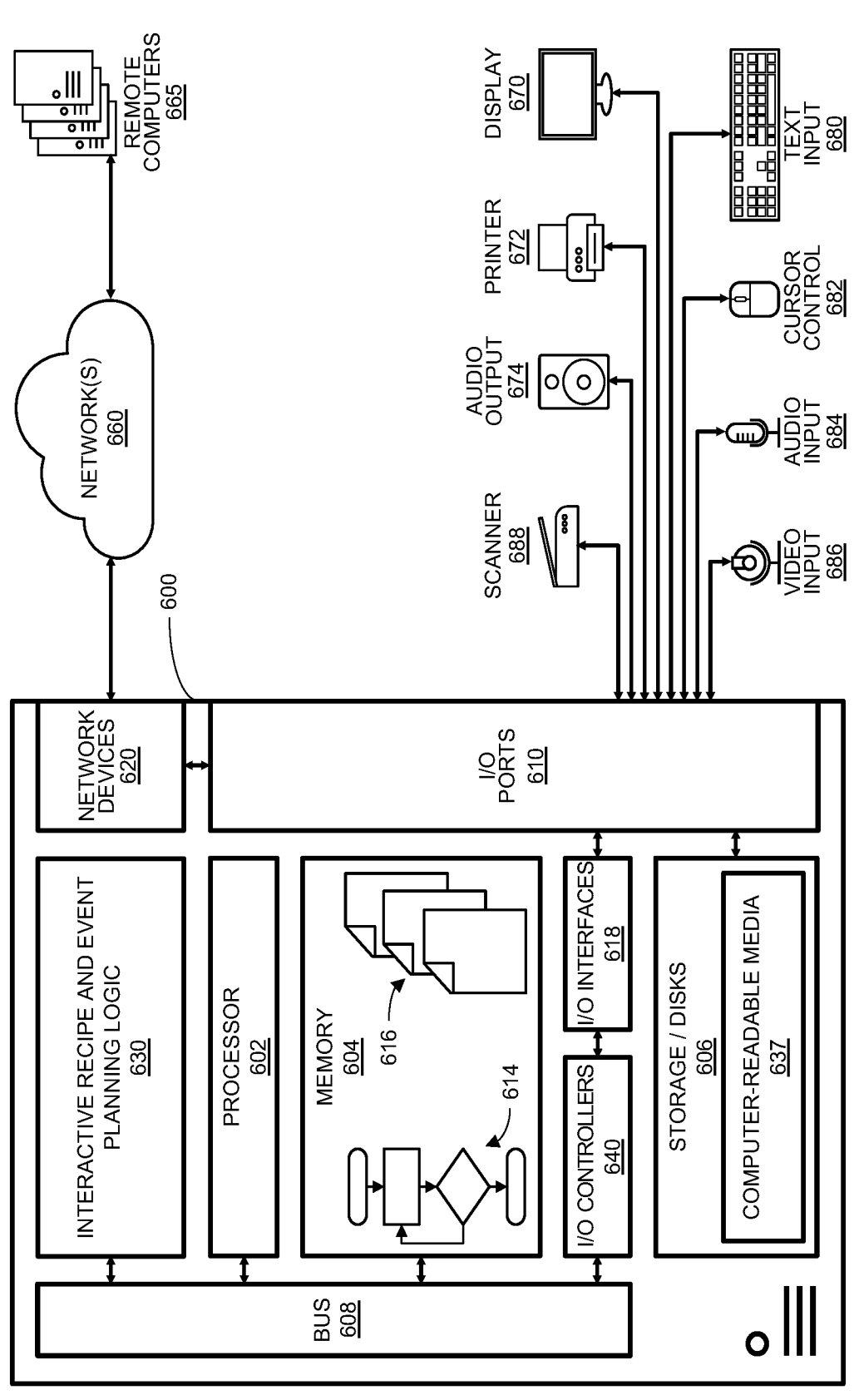
FIG. 6 illustrates an embodiment of a computing system configured with the example systems and/or methods disclosed.

FIG. 6 illustrates an example computing device that is configured and/or programmed as a special purpose computing device with one or more of the example systems and methods described herein, and/or equivalents. The example computing device may be a computer 600 that includes at least one hardware processor 602, a memory 604, and input/output ports 610 operably connected by a bus 608. In one example, the computer 600 may include interactive recipe and event planning logic 630 configured for creating interactive meal and event planning and management modules, retrieving content for each module, displaying and/or distributing the content of each module, and processing and retrieving additional modules and/or additional content for each module as the interactive meal and event planning and management system 100 and associated figures. The interactive content system 630 creates and distributes interactive meal and event planning and management modules. In different examples, the logic 630 may be implemented in hardware, a non-transitory computer-readable medium 637 with stored instructions, firmware, and/or combinations thereof. While the logic 630 is illustrated as a hardware component attached to the bus 608, it is to be appreciated that in other embodiments, the logic 630 could be implemented in the processor 602, stored in memory 604, or stored in disk 606.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate serial or parallel execution of creating interactive meal and event planning and management modules, retrieving content for each module, displaying and/or distributing the content of each module, and processing and retrieving additional modules and/or additional content for each module. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for performing one or more of the disclosed functions and/or combinations of the functions.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output (I/O) interface (e.g., card, device) 618 and an input/output port 610 that are controlled by at least an input/output (I/O) controller 640. The disk 606 may be, for example, a magnetic disk drive, a solid-state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with, control, and/or be controlled by input/output (I/O) devices via the input/output (I/O) controller 640, the I/O interfaces 618, and the input/output ports 610. Input/output devices may include, for example, one or more displays 670, printers 672 (such as inkjet, laser, or 3D printers), audio output devices 674 (such as speakers or headphones), text input devices 680 (such as keyboards), cursor control devices 682 for pointing and selection inputs (such as mice, trackballs, touch screens, joysticks, pointing sticks, electronic styluses, electronic pen tablets), audio input devices 684 (such as microphones or external audio players), video input devices 686 (such as video and still cameras, or external video players), image scanners 688, video cards (not shown), disks 606, network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network 660. Through the network, the computer 600 may be logically connected to remote computers 665. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a micropro-cessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed func-tions. In one embodiment, logic may include one or more gates, combinations of gates, or other circuit components configured to perform one or more of the disclosed func-tions. Where multiple logics are described, it may be pos-sible to incorporate the multiple logics into one logic. Similarly, where a single logic is described, it may be possible to distribute that single logic between multiple logics. In one embodiment, one or more of these logics are corresponding structure associated with performing the dis-closed and/or claimed functions. Choice of which type of logic to implement may be based on desired system condi-tions or specifications. For example, if greater speed is a consideration, then hardware would be selected to imple-ment functions. If a lower cost is a consideration, then stored instructions/executable application would be selected to implement the functions. Logic is limited to statutory sub-ject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combina-tions of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method executed by at least one processor of a computing system comprising a client computing device and at least one remote server, the method comprising:

generating, via a graphical user interface (GUI) displayed on the client computing device, at least one customiz-able plan module of a multi-process meal plan for at least one recipe, meal, or event (RME) for a defined time period including creating one or more recipe cards, wherein each recipe card of the one or more recipe cards includes at least one of: ingredient infor-mation, dietary information, allergen information, and nutritional information;

configuring at least one recipe card of the one or more recipe cards to define a meal component of a plurality of meal components of the multi-process plan, wherein each defined meal component includes at least one recipe card;

displaying, via the GUI, a plurality of partitions for each customizable plan module, each partition correspond-ing to one meal component of the plurality of meal components, and each partition configured to receive at least one recipe card for defining the corresponding meal component;

retrieving a nutritional information for each recipe card based on the contents of the recipe card;

receiving, via the GUI, user-specific nutritional profile data including at least one nutritional threshold value associated with a health condition of a user;

generating and displaying, via the GUI, an aggregate nutritional information corresponding to the defined meal components for the customizable plan module;

comparing, by the at least one processor, the aggregate nutritional information with the user-specific nutri-tional profile data to determine that the aggregate nutritional information satisfies the nutritional thresh-old value; and in response to determining that the nutritional threshold value is satisfied, generating and displaying, via the GUI, a graphical warning indicator associated with at least one of the partitions identifying a corresponding meal component as presenting a potential health con-cern.

2. The computer-implemented method of claim 1, further comprising randomly generating at least one defined meal component, wherein at least one recipe card is retrieved and added to at least one meal component of the plurality of meal components.

3. The computer-implemented method of claim 1, further comprising communicating at least one recipe or at least one defined meal component of the customizable plan module to one or more computing devices.

4. The computer-implemented method of claim 1, further comprising retrieving and displaying at least one recom-mended defined meal component from one or more com-puting devices.

5. The computer-implemented method of claim 1, further comprising generating and displaying, via the GUI, an aggregate listing of ingredients for at least one recipe card.

6. The computer-implemented method of claim 1, further comprising generating and displaying, via the GUI, an aggregate listing of one or more defined meal components of the customizable plan module.

7. The computer-implemented method of claim 6, further comprising communicating the aggregate listing of ingredients to a third-party application.

8. The computer-implemented method of claim 1, further comprising:

analyzing, via an artificial intelligence engine, user interaction history, dietary preferences, and user behavior to generate personalized recipe, card, and deck suggestions;

calculating and displaying aggregate nutritional values from recipes, cards, and decks; and receiving, via a user interface, drag-and-drop user input mechanics over a target section that automatically opens a view while maintaining a user drag operation, enabling seamless content organization.

9. The computer-implemented method of claim 1, wherein each customizable plan module defines a weekly meal plan, and a plurality of defined meal components defines a daily meal.

10. A non-transitory computer-readable medium that includes stored thereon computer-executable instructions that when executed by at least a processor of a computer cause the computer to:

generate, via a graphical user interface (GUI) displayed on a client computing device, at least one customizable plan module of a multi-process meal plan for at least one recipe, meal, or event (RME) for a defined time period, including creating one or more recipe cards, wherein each recipe card of the one or more recipe cards includes at least one of: ingredient information, dietary information, allergen information, and nutritional information;

configure at least one recipe card of the one or more recipe cards to define a meal component of a plurality of meal components of the multi-process plan, wherein each defined meal component includes at least one recipe card;

display, via the GUI, a plurality of partitions for each customizable plan module, each partition corresponding to one meal component of the plurality of meal components, and each partition configured to receive at least one recipe card for defining the corresponding meal component;

retrieve a nutritional information for each recipe card based on the contents of the recipe card;

generate and display, via the GUI, an aggregate nutritional information corresponding to the defined meal components for the customizable plan module;

receive, via the GUI, user-specific nutritional profile data including at least one nutritional threshold value associated with a health condition of a user;

compare, by the at least one processor, the aggregate nutritional information with the user-specific nutritional profile data to determine that the aggregate nutritional information satisfies the nutritional threshold value; and in response to determining that the nutritional threshold value is satisfied, generate and display, via the GUI, a graphical warning indicator associated with at least one of the partitions identifying a corresponding meal component as presenting a potential health concern.

11. The non-transitory computer-readable medium of claim 10, further comprising instructions that when executed by at least the processor cause the processor to:

communicate at least one recipe or at least one defined meal component of the customizable plan module to one or more computing devices.

12. The non-transitory computer-readable medium of claim 10, further comprising instructions that when executed by at least the processor cause the processor to:

retrieve and display at least one recommended defined meal component from one or more computing devices.

13. The non-transitory computer-readable medium of claim 10, further comprising instructions that when executed by at least the processor cause the processor to:

generate and display, via the GUI, an aggregate listing of ingredients for at least one recipe card.

14. The non-transitory computer-readable medium of claim 10, further comprising instructions that when executed by at least the processor cause the processor to:

generate and display, via the GUI, an aggregate listing of one or more defined meal components of the customizable plan module.

15. The non-transitory computer-readable medium of claim 14, further comprising instructions that when executed by at least the processor cause the processor to:

communicate the aggregate listing of ingredients to a third-party application.

16. The non-transitory computer-readable medium of claim 10, further comprising instructions that when executed by at least the processor cause the processor to:

add one or more ingredients to the recipe card.

17. A computing system, comprising:

at least one processor connected to at least one memory;

a non-transitory computer readable medium including instructions stored thereon that when executed by at least the processor cause the processor to:

generate, via a graphical user interface (GUI) displayed on a client computing device, at least one customizable plan module of a multi-process meal plan for at least one recipe, meal, or event (RME) for a defined time period, including creating one or more recipe cards, wherein each recipe card of the one or more recipe cards includes at least one of: ingredient information, dietary information, allergen information, and nutritional information;

configure at least one recipe card of the one or more recipe cards to define a meal component of a plurality of meal components of the multiprocess plan, wherein each defined meal component includes at least one recipe card;

display, via the GUI, a plurality of partitions for each customizable plan module, each partition corresponding to one meal component of the plurality of meal components, and each partition configured to receive at least one recipe card for defining the corresponding meal component;

retrieve a nutritional information for each recipe card based on the contents of the recipe card;

generate and display, via the GUI, an aggregate nutritional information corresponding to the defined meal components for the customizable plan module;

receive, via the GUI, user-specific nutritional profile data including at least one nutritional threshold value associated with a health condition of a user;

compare, by the at least one processor, the aggregate nutritional information with the user-specific nutritional profile data to determine that the aggregate nutritional information satisfies the nutritional threshold value; and in response to determining that the nutritional threshold value is satisfied, generate and display, via the GUI, a graphical warning indicator associated with at least one of the partitions identifying a corresponding meal component as presenting a potential health concern.

18. The non-transitory computer-readable medium of claim 17, further comprising instructions that when executed by at least the processor cause the processor to:

communicate at least one recipe or at least one defined meal component of the customizable plan module to one or more computing devices.

19. The non-transitory computer-readable medium of claim 17, further comprising instructions that when executed by at least the processor cause the processor to:

communicate the aggregate listing of ingredients to a third-party application.

\* \* \* \* \*